E. SPEDDEN.
ROW-LOCKS.
No. 183,872.   Patented Oct. 31, 1876.
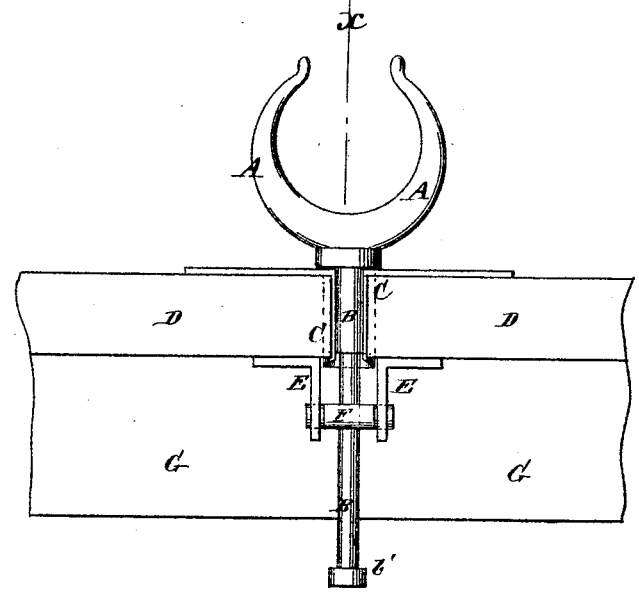
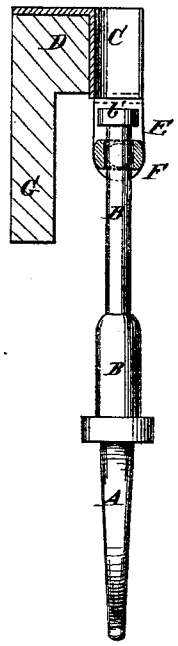
WITNESSES:
A. W. Almqvist
John Goethals
INVENTOR:
E. Spedden
BY Munn & Co
ATTORNEYS.

UNITED STATES PATENT OFFICE.

EUGENE SPEDDEN, OF ASTORIA, OREGON.

IMPROVEMENT IN ROWLOCKS.

Specification forming part of Letters Patent No. 183,872, dated October 31, 1876; application filed August 14, 1876.

*To all whom it may concern:*

Be it known that I, EUGENE SPEDDEN, of Astoria, in the county of Clatsop and State of Oregon, have invented a new and useful Improvement in Rowlocks, of which the following is a specification:

Figure 1 is a side view of my improved rowlock shown as applied to the gunwale of a boat. Figure 2 is a cross-section of the same, taken through the line $x\ x$, Fig. 1, the rowlock being shown as unshipped.

Similar letters of reference indicate corresponding parts.

The object of this invention is to furnish improved rowlocks, which shall be so constructed that they may be readily shipped and unshipped, and which cannot be lost, mislaid, or stolen.

The invention consists in a rowlock having the lower part of its stem made smaller than the upper part, and provided with a head, the slotted socket, the brackets, and the pivoted bar, in combination with each other, to adapt them to be attached to the gunwale of a boat, as hereinafter fully described.

A is the fork of the rowlock, that receives the oar, the stem B of which passes down through a socket, C, let into and secured to the gunwale D of the boat. The socket C is slotted upon its inner side for its whole length, said slot being of a less width than the diameter of the socket. The upper part of the stem B, for a distance equal to the length of the socket C, is made of such a size as to fit into the socket C, and the lower part is made smaller, being of such a size as to pass through the slot of the said socket. To the lower side of the gunwale D are attached two brackets, E, to and between which is pivoted the short bar F, through a hole in the center of which passes the smaller part of the stem B. The lower end of the stem B has a head, $b'$, formed upon or attached to it, to prevent it from being drawn out of the pivoted bar F. To unship the rowlock, it is raised until the smaller part of the stem B is in the socket C. The rowlock is then swung inward and downward, and allowed to hang along the side G of the boat. To ship the rowlock, it is swung upward and outward into a vertical position, and dropped into the socket C, as shown in Fig. 1.

Having thus described my invention, I claim as new and desire to secure by Letters Patent—

A rowlock, A, having the lower part of its stem B made smaller than the upper part, and provided with a head, $b$, the slotted socket C, the brackets E, and the pivoted bar F, in combination with each other, to adapt them to be attached to the gunwale of a boat, substantially as herein shown and described.

EUGENE SPEDDEN.

Witnesses:
 E. A. TAYLOR,
 W. H. TWILIGHT.